Nov. 24, 1942.   A. E. LAKE   2,303,286
REMOVABLE AUTOMOBILE BODY
Filed Sept. 16, 1940   2 Sheets-Sheet 1
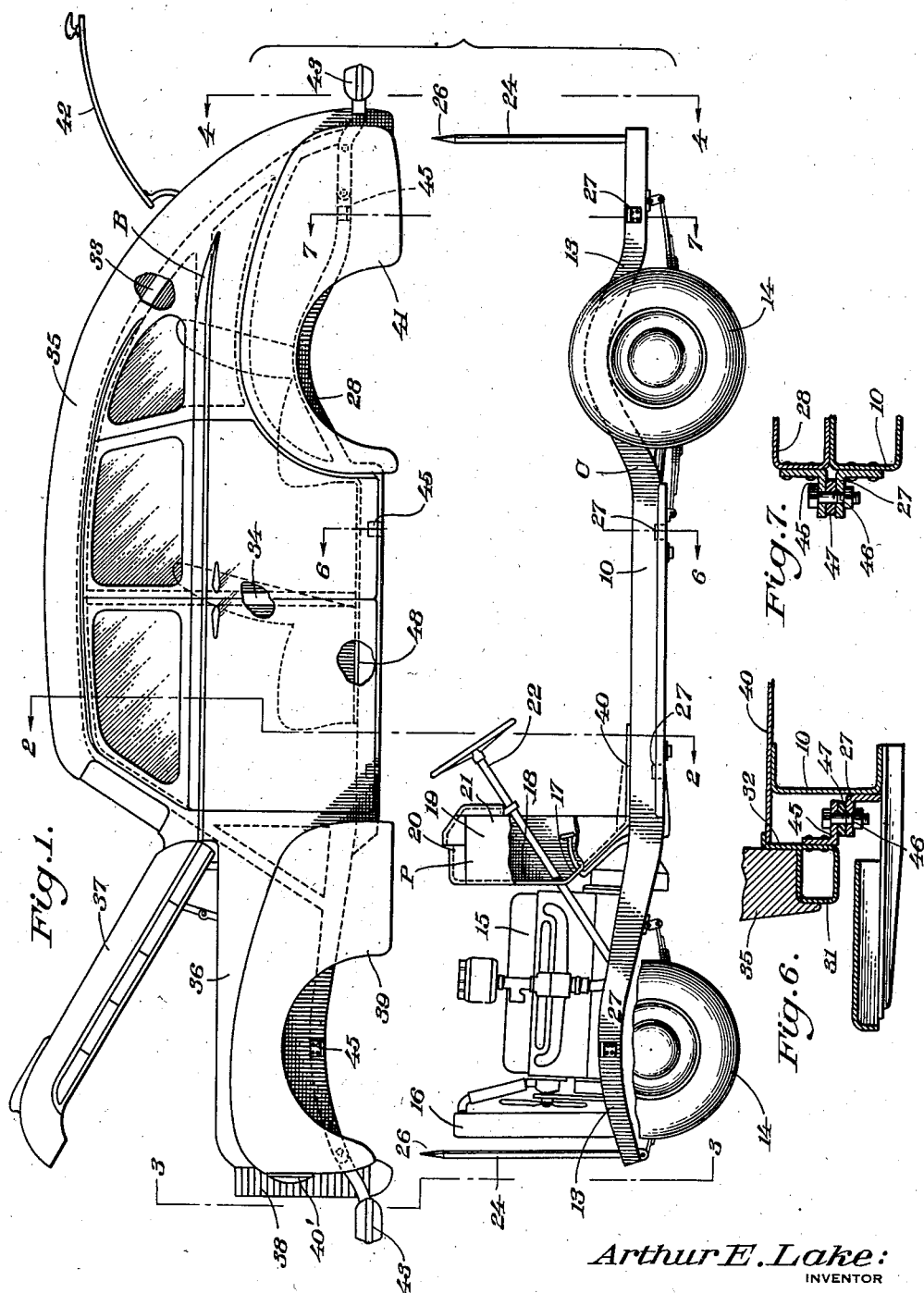
Arthur E. Lake,
INVENTOR
BY Victor J. Evans & Co.
ATTORNEYS

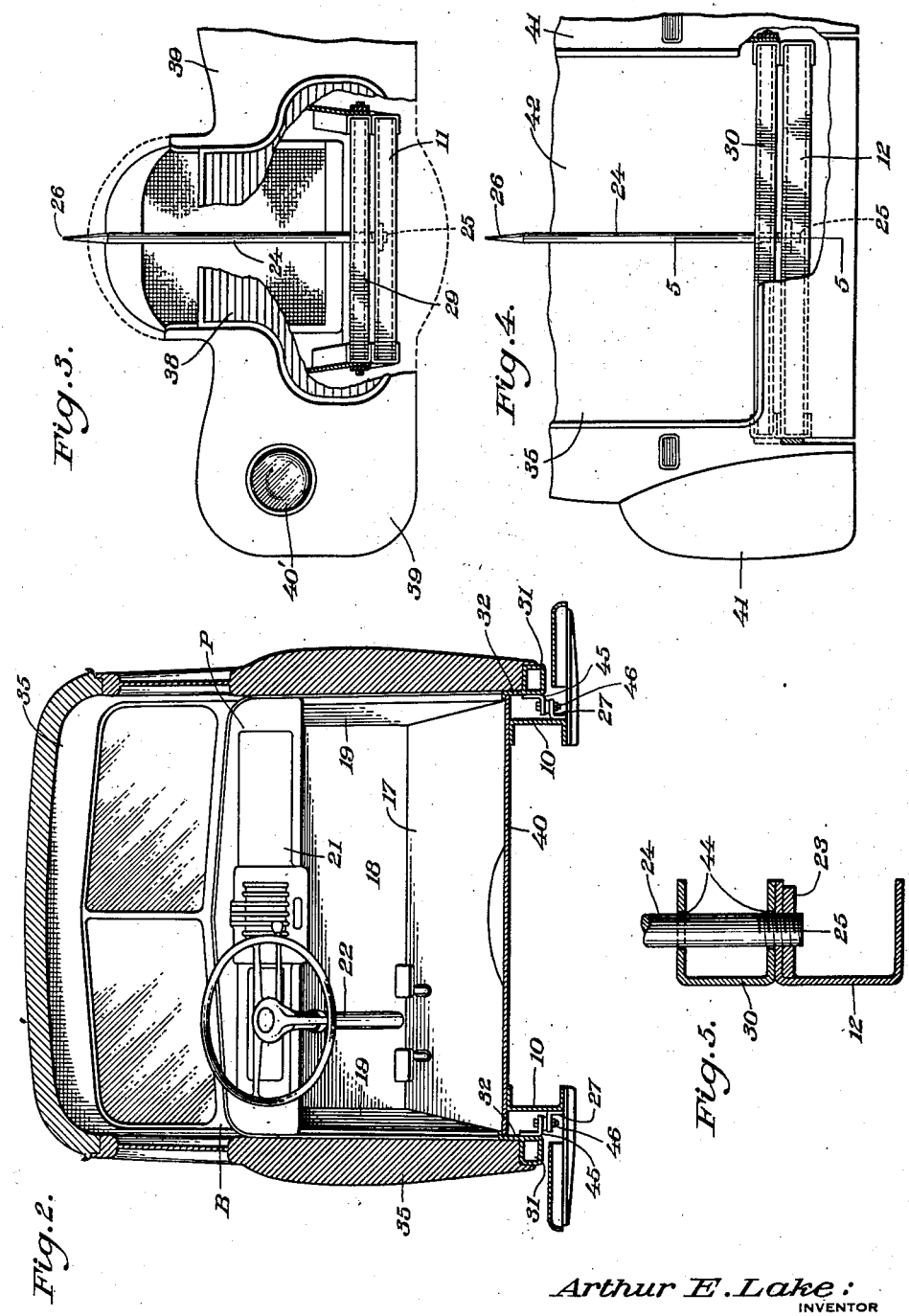

Patented Nov. 24, 1942

2,303,286

UNITED STATES PATENT OFFICE 2,303,286

REMOVABLE AUTOMOBILE BODY

Arthur E. Lake, Pleasantville, N. J.

Application September 16, 1940, Serial No. 357,051

2 Claims. (Cl. 296—35)

The present invention relates to improvements in automobile construction and has particular reference to an automobile in which the body is removable as a unit from the chassis.

A primary object of the invention is to provide an automobile constructed so that the body may be quickly and easily removed from the chassis.

Another object of the invention is the provision of an automobile which is designed to enable quicker and easier repair and replacement of parts.

A further object of the invention is to provide an automobile having a chassis equipped with guide means and connecting elements designed for detachable connection therewith of a body unit.

Still another object of the invention is to provide an automobile which is exceptionally tight, strong and durable in assembly.

Other objects and advantages of the invention will become apparent as the description progresses.

In the accompanying drawings forming a part of this specification and in which like numerals are employed to designate corresponding parts throughout:

Figure 1 is a side elevational view of the improved automobile showing the body removed from the chassis, Figure 2 is a transverse section taken on line 2—2 of Figure 1 with the body and chassis assembled, Figure 3 is a front view of the assembled vehicle as viewed from line 3—3 of Figure 1, Figure 4 is a rear view of the assembly as viewed from line 4—4 of Figure 1, Figure 5 is an enlarged fragmentary section taken on line 5—5 of Figure 4, Figure 6 is an enlarged section through the connection assembly taken on line 6—6 of Figure 1, and Figure 7 is a similar view taken on line 7—7 of Figure 1.

Referring to the drawings, wherein is illustrated a preferred example of the invention, C generally designates the chassis of the automobile embodying a rectangular shaped frame composed of longitudinally extending side bars 10 tightly connected with transverse front and rear bars 11 and 12. These bars may advantageously be formed of steel channel stock having the side bars 10 formed with a diminishing taper toward the ends and shaped to provide arched sections 13 adjacent the front and rear to accommodate the vehicle axles. Such axles, carrying wheels 14, are connected with the frame C in suitable known manner. On the forward part of the chassis frame is mounted a conventional engine 15 making connection with a radiator 16 also secured to the frame.

Immediately at the rear of the engine 15 is mounted a panel support P rigidly fastened to the frame 10 having an inclined bottom dash wall 17 joining a vertical wall section 18 and formed integrally with side walls 19 connecting with a top crown 20. Depending from the crown 20 and connecting with the side walls 19 is a panel 21 adapted to carry the usual automobile instruments thereon. A conventional steering post and wheel assembly 22, having the post extending through the panel structure P, is mounted in conventional manner on the frame for steering operation.

Secured on the chassis frame C and extending horizontally rearward from the inclined wall 17 is a floor section 40.

At the center of the front and rear transverse frame bars 11 and 12 are provided interiorly threaded vertical sockets composed of a reinforcing boss or plate 23 welded or otherwise secured to the under side of the top flange and having an interiorly threaded bore formed through the flange and plate, as shown to advantage at Figure 5. This bore or socket structure is designed to accommodate therein the lower end portion of a guide member 24, in the form of a round rod having the lower portion exteriorly threaded as indicated at 25 to engage the socket and the upper end tapered to afford a centering tip 26. A rod 24 is adapted to be mounted in upstanding position at the front and at the rear of the chassis frame for a purpose which will be hereinafter described.

To the exterior sides of the longitudinal frame bars 10 are fastened a plurality of, in the present instance four, connecting elements 27 each of which embodies an angular bracket having one flange fastened in vertical position to the frame by rivets or other suitable fastening means, and the opposite flange projecting laterally from the top of the former and apertured. This construction provides horizontal apertured lugs arranged one over the front axle, another rearwardly of the panel structure P and an additional pair arranged immediately forward and rearward of the rear wheel at each side of the frame.

Designed for detachable connection with the chassis unit C is a body unit B embodying a rectangular shaped frame composed of longitudinal bars 28 and front and rear bars 29 and 30 respectively, the said bars being firmly united in accordance with the assembly of the chassis frame. This body frame structure is designed to be firmly seated on the frame of the chassis C so that the front and rear parts, which may be of channel stock, fit evenly upon the front and rear portions of the chassis frame. The central portion of each body frame side bar 28 may advantageously be of tubular cross section as indicated at 31 and is offset outwardly to lie in laterally displaced position relative to the deeper center portion of each chassis side bar 10, as shown to advantage at Figure 6. These intermediate portions of the frame bars are constructed to provide upstanding angular lip portions 32. To the horizontal frame structure composed of the frame bars 28, 29, 30 and 31 are connected approximately arcuate side girders 33 disposed vertically at each side and braced at longitudinally spaced intervals by brace bars 34. On the frame structure thus formed is fitted a body housing 35 which may consist of an essentially sheet metal shell providing the customary doors and windows of a passenger automobile together with the windshield and formed integrally with an engine hood as shown at Figure 1. In the present example this hood structure embodies a pair of complementary side sections 36 cooperatively related with a hinged cover 37 and carrying, at the front, a suitable grill work 38 as is usual in such cars. To the sides of the hood sections 36 are firmly secured front wheel fenders 39 which may carry headlights 40 at the front thereof. Rear wheel fenders 41 are likewise secured to the rear side portions of the body housing 35, while the rear of the housing may be equipped with the customary baggage compartment normally closed by a hinged door 42. Conventional bumpers 42 may also be attached to the front and rear of the body frame as illustrated at Figure 1.

The top and bottom flanges of both the front and rear frame bars 29 and 30 are provided with vertically aligned holes 44, as best shown at Figure 5, in order to slidably fit these parts over the guide rods 24 removably connected with the chassis frame. To the body side frame sections 28 and 30 are secured angular brackets 45 mounted to provide apertured lugs projecting laterally of the frame at each side and designed to register with the lugs of the brackets 27 attached to the chassis frame.

When the body and chassis units are assembled for use, the main bottom frame structure of the body is fitted on the chassis frame in such manner that the front and rear portions of the body frame are seated directly upon the chassis frame as shown to advantage at Figures 5 and 7, and the lugs 45 projecting laterally from the frame structure assume superposed positions on and are firmly connected by bolt and nut fasteners 46 to the lugs of brackets 27. The intermediate portions of the side frame members 28 of the body are shaped to assume positions spaced laterally of and parallel with the intermediate parts of the chassis frame bars 10, as shown to advantage at Figures 2 and 4, and the lug carrying brackets 45 are secured to the inner sides of the frame sections 31 so that the horizontal lugs thereon will overlie the outwardly projecting lugs on the frame sections 10 for firm connection by the bolt fastenings 46. To reduce vibration and effect a squeakproof connection of these complementary frame parts washers 47 of rubber or like cushioning material are preferably interposed between the complementary connecting lugs. In such assembly the angular portions 32 of the body frame are fitted to engage the side margins of the floor section 40 fastened on the chassis while the floor structure 48 mounted on the body B extends rearwardly from the rear edge of the section 40 to the rear end of the body. In order to remove the body unit from the chassis unit the bolt fastenings 46 are removed from the coacting lugs of the frames and the body elevated by a hoist or other suitable raising means so as to afford convenient access to the various parts of the vehicle.

When the body is to be assembled on the chassis the guide rods 24 are secured in upstanding positions in the front and rear sockets of the chassis frame and the body is lowered in such manner that the holes 44 in the front and rear frame bars of the body frame register with the guides to accurately position the body frame on the frame of the chassis, following which the lugs on the respective frames are tightly bolted together, and the guide rods removed.

This construction provides a very solid frame assembly without substantial increase in weight inasmuch as the complementary frame sections may each be of smaller stock than the single frame structure heretofore commonly employed. Furthermore, such assembly affords greater protection in case of accident and reduces the development of squeaks and rattles without material increase in the cost of manufacture. As will also be apparent such convenient separation of the body from the chassis will greatly facilitate the repair and cleaning of the vehicle and will enable the rapid substitution of bodies of different types upon a single chassis.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In an automobile, a chassis unit including a rectangular wheel supported frame having front and rear transverse bars connected to the ends of side bars, a propelling engine mounted on the said frame, a rectangular shaped body frame separably mounted on the chassis frame, the said body frame having transverse end bars overlying the end bars of the chassis frame and having intermediate parts of its side bars disposed laterally of and parallel with the sides of the chassis frame, a plurality of lugs projecting in complementary relation from the respective frames, and elements fastening the complementary lugs for tightly connecting the frames in superposed relation.

2. In a structure for quickly demounting and assembling the body of a motor vehicle, a chassis frame section having front and rear transverse bars connected to the ends of a pair of longitudinally extending side bars, a complementary frame section connected to the vehicle body having transverse end bars disposed to rest on the front and rear bars of the chassis frame, and having side bars provided with intermediate transversely offset portions, each side bar of the body frame section being shaped so that its end portions rest upon end portions of each side bar of the chassis frame section and its intermediate portion is arranged in outwardly offset parallel position with relation to the intermediate portion of each chassis frame side bar, and means for releasably fastening the said body frame section on the chassis frame section.

ARTHUR E. LAKE.